United States Patent [19]
Dahn et al.

[11] Patent Number: 4,902,589
[45] Date of Patent: Feb. 20, 1990

[54] ELECTROCHEMICAL CELLS, ELECTRODES AND METHODS OF MANUFACTURE

[75] Inventors: Jeffery R. Dahn, Surrey; David Wainwright, Vancouver, both of Canada

[73] Assignee: Moli Energy Limited, Canada

[21] Appl. No.: 204,072

[22] Filed: Jun. 8, 1988

[51] Int. Cl.[4] .............................................. H01M 6/10
[52] U.S. Cl. ........................... 429/94; 29/623.4; 429/217
[58] Field of Search .............. 429/94, 217, 623.3, 429/623.4

[56] References Cited

U.S. PATENT DOCUMENTS

| | | | |
|---|---|---|---|
| 4,391,729 | 7/1983 | Liang et al. | 429/217 |
| 4,565,751 | 1/1986 | Faust et al. | 429/94 |
| 4,576,883 | 3/1986 | Hope et al. | 429/192 |
| 4,594,299 | 6/1986 | Cook et al. | 429/129 |
| 4,622,277 | 11/1986 | Bedder et al. | 429/94 |
| 4,648,177 | 3/1987 | Uba et al. | 429/94 |
| 4,720,910 | 1/1988 | Rourke et al. | 429/192 |

FOREIGN PATENT DOCUMENTS

| | | |
|---|---|---|
| 0145231 | 6/1985 | European Pat. Off. . |
| 0145498 | 6/1985 | European Pat. Off. . |
| 0146246 | 6/1985 | European Pat. Off. . |
| 2148586 | 5/1985 | United Kingdom . |
| 2149197 | 6/1985 | United Kingdom . |
| 2158987 | 11/1985 | United Kingdom . |

Primary Examiner—Donald L. Walton
Attorney, Agent, or Firm—Lerner, David, Littenberg, Krumholz & Mentlik

[57] ABSTRACT

An electrode precursor for lithium batteries includes a layer of an electrochemically active particulate material and a binder. The binder is soluble in the cell electrolyte so that the electrolyte extracts the binder from the particulate material after assembly, leaving a particulate layer substantially devoid of binder. Thus, the binder does not significantly decrease electrical conductivity of the layer in the cell and does not impede the ionic access to the layer. The soluble binder may be present in the electrode precursor in an amount sufficient to protect particulate which would otherwise react with the atmosphere.

4 Claims, 3 Drawing Sheets

ELECTROCHEMICAL CELLS, ELECTRODES AND METHODS OF MANUFACTURE

FIELD OF THE INVENTION

This invention relates to electrochemical cells such as storage batteries and electrodes for use in such cells and also relates to materials and methods for making the electrodes and cells.

BACKGROUND OF THE INVENTION

Electrochemical cells such as electrical storage cells or "batteries" may include electrochemically active materials in powder form. One known type of storage battery includes an anode of metallic lithium, a liquid electrolyte and a cathode incorporating a particulate electrochemically active material capable of taking up and releasing lithium ions. The particulate material typically is fixed to an electrically conductive current collector. During discharge, lithium ions from the anode pass through the liquid electrolyte to the particulate material of the cathode where the ions are taken up with release of electrical energy. An electrical current flows through the particulate material of the cathode, to the current collector and to the external load. During charging, the current flow and the flow of ions are reversed, so that current passes from the current collector to the particulate material and lithium ions pass from the particulate material through the electrolyte to the lithium anode. Operation of the cell requires interchange of ions between the liquid electrolyte and the individual particles of electrochemically active material, and also requires passage of an electrical current through the active material to and from the current collector.

The current collector may be a sheetlike metal element, whereas the particulate material may be distributed as a layer on the surface of this sheetlike collector. The particles typically are attached to the current collector and to one another by a polymeric binder. The binder maintains coherence of the particles and collector during cell assembly and during operation of the cell. The cell assembly operation typically involves forming the layered cathode current collector and particulate material into a sandwich like structure with other components such as a sheet-like porous separator and a sheet-like anode. This sandwich structure is then formed into a compact, convoluted structure as by folding or by winding into a spiral. The binder is particularly critical to successful completion of the convoluting process.

The binders utilized heretofore have been selected so as to resist chemical effects caused by the electrolyte. Thus, highly inert polymers such as polytetrafluoroethylene (PTFE) and polymers of ethylene propylene diene monomer (EPDM) have been used as binders. These polymers are electrical insulators. These polymers also retard movement of ions between the electrolyte and the particulate active material. As the proportion of binder in the layer of particulate material is increased, the mechanical stability of the layer is also increased. However, this increase in mechanical stability is also accompanied by a decrease in the electrical conductivity and a decrease in ionic access to and from the powdered material. Both of these factors tend to decrease cell performance. Accordingly, the amount of binder utilized heretofore has been limited and selected to provide a compromise between these competing considerations.

Electrodes of this type are usually solvent cast by dispersing the binder and the particulate, active material in a solvent, depositing this dispersion onto the current collector and evaporating the solvent. This procedure usually creates a "skin" or region of particularly high binder concentration at the surface of the particle layer remote from the current collector. This "skin" further aggravates the problem of ionic access.

Additionally, many particulate electrochemically active materials will spontaneously react with the ordinary ambient atmosphere. For example, lithiated molybdenum disulfide is pyrophoric; it will ignite spontaneously when exposed to ordinary ambient air. Other electrochemically active particulate materials will not react so violently, but will nonetheless be damaged by exposure to air. Electrodes incorporating such materials heretofore have generally been handled under inert atmospheres. Use of such an inert atmosphere is costly.

Accordingly, there have been significant needs heretofore for improvements in electrochemical cells and improvements in methods of making such cells.

SUMMARY OF THE INVENTION

The present invention addresses those needs.

One aspect of the present invention provides a method of making an electrochemical cell. The method includes the step of providing an electrode precursor including an electrochemically active particulate material and a binder interspersed with the particulate material and maintaining the coherence of the particulate material. The electrode precursor is assembled with other components of the cell such as a counter electrode, the cell outer container, or both. After assembly, the assembled components are contacted with a liquid that at least some of the binder dissolves in the liquid, thus removing the binder from the electrode precursor. Thus, some of the binder is removed from the electrode precursor, thereby converting the electrode precursor to an electrode including less binder than was originally present in the electrode precursor. Preferably, substantially all of the binder is removed from the electrode precursor by dissolution in the liquid, so that the resulting electrode is substantially devoid of binder.

Most preferably, the liquid electrolyte used in operation of the cell acts as the binder-dissolving liquid. The electrolyte and the binder in the electrode precursor are selected so that the binder is at least partially soluble in the electrolyte. Thus, the electrolyte is added to the cell to contact the electrolyte precursor and counter electrode. At least some of the binder in the electrode precursor dissolves in the electrolyte.

The assembly step desirably includes the step of engaging the electrode precursor with at least one other component of the cell so that the other component or components will bear upon the particulate material in the assembly and hence will aid in maintaining coherence of the particulate material after assembly. The binder is present in the electrode precursor before and during assembly to maintain coherence of the particulate material, but is effectively removed from the particulate material upon assembly and dissolution. Therefore, the binder will not impede electrical conductivity in the particulate material or passage of ions between the electrolyte and the particulate material in the electrode of the finished cell. Methods according to this aspect of the present invention thus provide all of the practical advantages afforded by the binder in cell assembly procedures, but substantially eliminate the detrimental affects of the binder on the performance of the finished cell.

The electrode precursor may include a layer incorporating the particulate material and binder, and the method may include the step of forming this layer into a convoluted structure, so that the finished cell will include a convoluted layer of the particulate material. Thus, the layer of particulate material may be juxtaposed with other sheet-like components of the cell to form a sandwich structure and this sandwich structure may be wound into a spiral or otherwise formed into a convoluted shape during the assembly procedure. Methods according to preferred aspects of the present invention provide a way to make a cell including a convoluted particulate layer substantially devoid of interstitial binder between the particles of the layer. Preferred methods according to this aspect of the invention are fully compatible with the cell assembly equipment utilized heretofore to form cells with electrodes incorporating binders.

Methods according to this aspect of the present invention are particularly useful in manufacture of cells including a lithium metal anode and a cathode incorporating a particulate, cathode-active material. The total volume of the cathode and anode in such a cell tends to increase as the cell is cyclically discharged and recharged during use, so that "stack pressure" or pressure of engagement between the elements of the cell tend to increase. This increasing stack pressure tends to more firmly retain the coherence of the particulate material. The present invention further incorporates the discovery that certain polymers such as polymers selected from the group consisting of polyethylene oxide, polyacrylonitrile and polyvinylidene fluoride can act satisfactorily as binders in the electrode precursor but can also be dissolved in electrolyte solvents used in lithium cells, such as solvents selected from the group consisting of propylene carbonate, ethylene carbonate and 2-methyl tetrahydrofuran, without substantial adverse effect on the performance of the cell.

Moreover, methods according to the present invention are particularly useful where the particulate electrochemically active material is subject to degradation upon exposure to the ambient atmosphere, as where the material is pyrophoric or otherwise reactive. Because the binder is effectively removed from the particulate material, the electrode precursor can incorporate binder in an amount sufficient to effectively protect the particulate material from the atmosphere without substantially adversely affecting performance of the finished cell.

Further aspects of the present invention provide improved electrochemical cells. Cells according to this aspect of the present invention preferably include a first electrode having a layer of particulate, electrochemically active material, a counter electrode spaced from this layer and an electrolyte in contact with the layer and the counter electrode. The layer of particulate material is convoluted, but is substantially devoid of interstitial binders connecting the particles to one another. Most desirably, the cell includes a sheet-like support and a sheet-like porous separator, the layer of particulate material being disposed between the porous separator and the support, so that the layer closely overlies the support. Typically, the counter electrode incorporates a sheet-like counter structure such as a layer of a foil, and the counter electrode, separator, particulate layer and support form a sandwich-like structure, this sandwich-like structure as a whole being in a convoluted form such as spiral. The cell desirably includes means for maintaining interengagement of the elements in the sandwich structure. These means may include the external casing of the cell or other components bearing upon the convoluted sandwich structure. The cell may be a lithium cell, wherein the counterelectrode incorporates a lithium anode and the electrochemically active particulate material includes a material adapted to take up and release lithium ions. This aspect of the present invention provides a cell incorporating all of the advantages associated with convoluted particulate material layers but without the disadvantages of binders previously believed necessary in such layers.

These and other objects, features and advantages of the present invention will be more readily apparent from the detailed description of the preferred embodiments set forth below, taken in conjunction with the accompanying drawings.

DETAILED DESCRIPTION OF THE PREFERRED EMBODIMENTS

Figure 1:
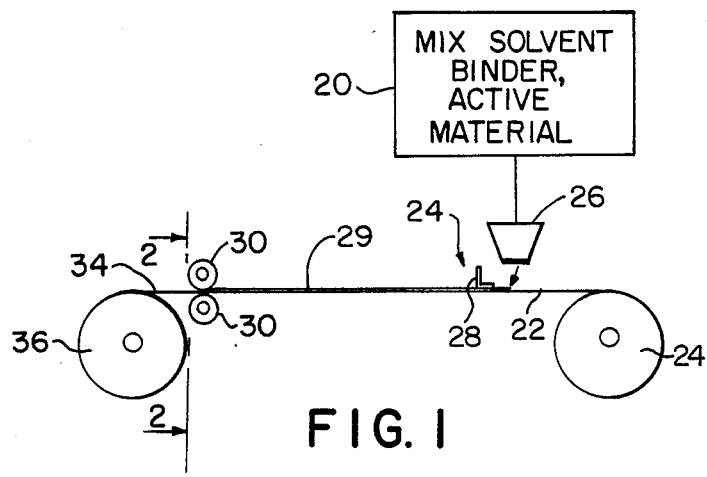
FIG. 1 is a schematic view showing a portion of a process in accordance with one embodiment of the present invention.

A process according to one embodiment of the present invention includes a mixing operation 20 (FIG. 1) wherein a binder and an electrochemically active particulate material are dispersed in a solvent to form a slurry. It should be noted that although reference will be made here to foil coating, other techniques such as reverse roll coating may also be used. The slurry formed in the mixing operation is deposited in a layer on a sheetlike support 22 consisting of a metallic foil such as aluminum, nickel or copper using conventional coating equipment 24. In this step, metallic foil or support 22 is fed from a supply roll 24 beneath a dispensing head 26 containing the slurry so that the slurry is deposited upon the advancing foil. A knife 28 immediately downstream from the dispensing head smoothes the deposited slurry into a substantially flat, continuous layer 29 and controls the thickness of the layer. Typically, the layer as deposited is less than about 1.0 mm thick, preferably less than about 0.5 mm thick and most preferably about 0.2 mm thick. As the support or foil with the layer 29 thereon passes downstream from the knife, the solvent contained in the layer evaporates. Ordinarily, the solvent in the thin layer evaporates rapidly under ambient conditions. If desired, gentle heating and/or forced draft ventilation may be applied to accelerate evaporation. However, any such heating should be controlled to avoid boiling of the solvent and hence to avoid formation of bubbles in the layer. The atmosphere surrounding the layer during the evaporation process may consist of ambient air. Where the active material is sensitive to moisture in the air, the atmosphere may consist of substantially dry air, preferably at less than about 2.0% relative humidity and most preferably at about 0.5% relative humidity. After the solvent is substantially evaporated, the layer may be compacted on the support or foil, as by passing the support and foil between a pair of opposed pressing elements or rollers 30. These compacting elements desirably provide a compacting pressure of between about 3,000 and about 10,000 KPA. The laminar structure 34 formed in these operations may be wound onto a storage reel 36.

Figure 2:
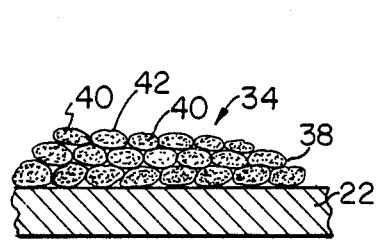
FIG. 2 is a schematic sectional view on an enlarged scale taken along line 2—2 in FIG. 1.

As seen in FIG. 2, the laminar structure 34 includes a sheetlike electrode precursor layer 38 incorporating the particular material and binder superposed on the sheetlike support or foil 22. Within electrode precursor layer 38, each individual particle 40 of electrochemically active material is substantially covered by a thin coating 42 of binder. The binder at least partially fills the interstices between the individual particles and interconnects the individual particles to one another so as to form a coherent layer. Also, the binder adheres to the support or foil 22, thereby securing layer 38 to the foil. The sizes of the individual particles and the thickness of the coating, are greatly exaggerated for clarity of illustration in FIG. 2. The coating on the individual particles may be either discontinuous or substantially continuous. Generally, with binder:active material ratios of about 2:100 by weight or more in the layer 38, the coatings on the individual particles are substantially continuous and hence substantially inhibit reaction of the active material with the surrounding atmosphere. Thus, where the active material is a highly reactive material such as a lithium-bearing material, binder:active material ratios of about 2:100 are preferred.

Figure 4:
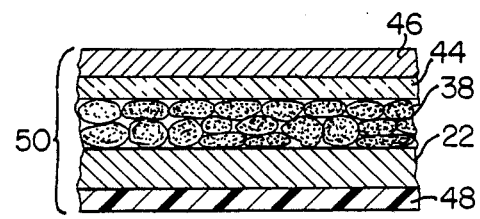
FIG. 4 is a schematic sectional view similar to FIG. 2 but taken along lines 4—14 in FIG. 3.
Figure 3:
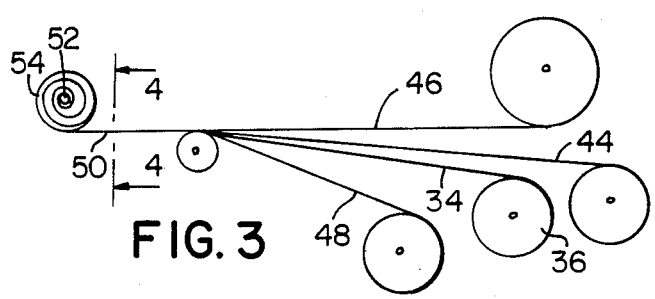
FIG. 3 is a further schematic view showing a further stage in the process depicted in FIGS. 1 and 2.

Laminar structure 34 is laminated with other sheetlike components as schematically illustrated in FIG. 3. The laminar structure 34 is wound off of storage reel 36 and juxtaposed with a sheetlike, porous, electrically insulating separator 44, which may be a polypropylene or other polymeric mesh and a sheetlike anode 46 consisting of a lithium or other appropriate metal foil. An electrically insulating, inert backing sheet 48 may also be applied at this stage. As best seen in FIG. 4, separator 44 is superposed on the face of electrode precursor layer 38 remote from the foil or support 22, so that the particulate material or electrode precursor layer 38 lies between the separator and the support or foil 22. The lithium metal foil or anode layer 46 is superposed on separator 44, whereas the insulator or backing 48 is juxtaposed with the rear face of the foil support, remote from the electrode precursor or particulate layer 38. These sheetlike components cooperatively form a sheetlike, flexible sandwich structure 50.

The sandwich structure is wound onto an inner core or mandrel 52 concomitantly with the laminating operation, thus forming the sandwich structure into a convoluted, spiral configuration. Most preferably, the sandwich structure is wound onto the core under tension, applied by conventional tensioning devices (not shown). The tension applied during winding produces a compressive load between neighboring turns of the spiral structure 54. Compressive load between components in a cell is also referred to as "stack pressure".

After an appropriate length of the sandwich structure to form a spiral 54 of a desired dimensions has been wound onto a core 52, the sandwich structure is severed while still maintaining the compression between adjacent layers of the spiral. Thus, the spiral wound structure can be retained by clamps or bands. Each spiral-wound structure 54 formed by this process is then placed into a container 56, which is then closed by a cap 58. The anode foil 46 and foil support 22 are electrically interconnected by conventional means with the cap 58 and container 56 so that the cap and container serve as terminals for the finished cell. The spiral wound structure 54 is adapted to fit tightly in container 56, thus maintaining the turns of the spiral in compression against one another. The cell may also incorporate resilient elements (not shown) either in core 52 or around the periphery of spiral wound structure 54 to aid in maintaining the compression or "stack pressure" within the spiral wound structure.

Figure 5:
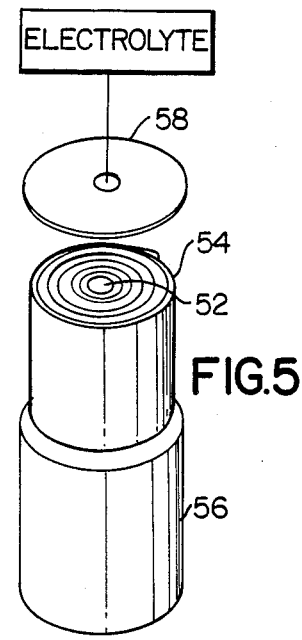
FIG. 5 is further schematic view showing yet a further stage in the process of FIG. 1–4.

Once the container has been closed, it is filled with an electrolyte, typically through an opening in the cap 58, and this opening is then sealed. The assembly operation, including the laminating step shown in FIG. 3 and the container-loading step shown in FIG. 5 most preferably is conducted in a dry air atmosphere. The binder coating on the active material particles protects the active material and inhibits reaction of the active material with the surrounding atmosphere.

Figure 6:
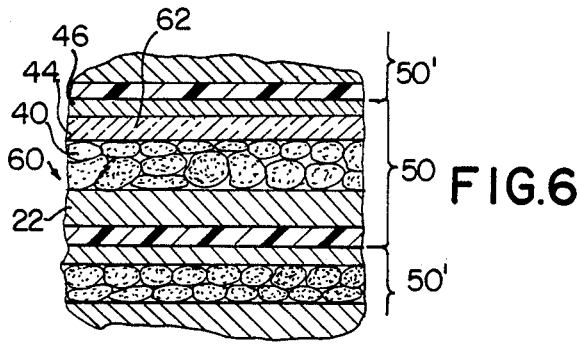
FIG. 6 is a fragmentary sectional view similar to FIGS. 2 and 4 but depicting a portion of the completed cell formed by the process of FIGS. 1–5.

When the electrolyte is introduced into the cell, the binder originally present in the electrode precursor or particulate layer 38 dissolves in the electrolyte. This removes the binder coating on the individual particles 40 of active material within layer 38, and removes substantially all of the binder from the interstices between particles 40 in layer 38. In effect, the binder dissipates within the electrolyte, so that the material formerly present in the binder becomes a part of the electrolyte. Thus, the electrode precursor layer originally containing both binder and particulate active material is transformed into an electrode layer 60 (FIG. 6) substantially devoid of interstitial binder, i.e., substantially devoid of undissolved binder separate from the electrolyte. Layer 60, of course, is in the convoluted, spiral-wound configuration formed during the assembly procedures. Because layer 60 is substantially devoid of binder, the electrolyte 62 is in intimate contact with each particle 40 of active material, so as to facilitate transfer of lithium ions through the electrolyte between the active material particles 40 and the anode foil 46 during operation of the cell. Also, because layer 60 is substantially devoid of interstitial binders, the particles 40 are in intimate contact with one another and with support or foil 22. Thus, the particles 40 are in intimate electrical contact with one another and with support or foil 22 thus providing a current conduction pathway of relatively low resistance between particle 40 and foil 22.

Inasmuch as the finished layer 60 is substantially devoid of binders, the electrode layer by itself has no coherence. However, layer 60 is engaged under pressure between other elements of the cell, in this case between separator 44 and support or foil 22. This engagement is maintained by the stack pressure in the cell. Thus, each turn 50 of the sandwich structure is held between neighboring turns 50', so that the stack pressure is applied throughout all of the turns. This pressure maintains the individual particles 40 within the electrode layer 60 in intimate physical engagement with one another and with support or foil 22. The stack pressure within a lithium-based cell generally tends to increase during operation of the cell due to expansion of the lithium anode 46 upon repetitive plating of the lithium metal onto the anode during charging. Additionally, where resilient elements are used to provide the stack pressure, these resilient elements will tend to maintain the stack pressure during operation. Thus, in the cell-manufacturing process discussed above, the binders in the electrode precursor layer maintain coherence of the particulate material as required during the assembly operation, and as particularly necessary during the convoluting or spiral-winding process. However, the binder is effectively removed from the electrode precursor to leave a convoluted particulate electrode substantially devoid of binders and hence having performance substantially unimpeded by binder. The electrochemically active material may include substantially any known electrochemically active material. In particular, where the electrochemically active material is intended to form a cathode, substantially any known cathode-active material capable of taking up and releasing metal ions can be employed. Among the cathode-active materials which may be employed are Chevrel-phase materials such as $Mo_6S_8$; beta-phase and gamma-phase $MoS_2$; vanadium oxide such as $VO_2(B)$, $V_6O_{13}$; and $FeS_2$. The particulate cathode-active material may include these materials in metal-laden or partially metal-laden form as, for example, $Li_xMo_6S_8$ where x is between 1 and about 4; $Li_xMoS_2$; $Li_xFeS_2$; $Li_xCu_yFeS_2$ where x+y=about 1 and others.

The particulate electrochemically active cathode material may be treated in the conventional manner to enhance its electrical conductivity. For example, $MoS_2$-based materials may include a minor proportion of $MoO_2$, typically at the surfaces of the individual particles, to enhance the electrical conductivity of the material. The particulate, electrochemically active material preferably has a mean particle size less than about 0.05 mm and more preferably between about 0.001 and about 0.030 mm.

The binder includes a material, preferably a polymeric material, which is soluble in the electrolyte to be used in the cell. Polyethylene oxide is particularly preferred as a binder. Other polymeric binders which may be employed include polyacrylonitrile and polyvinylidine fluoride. Substantially any solvent may be employed provided that the solvent does not react with the electrochemically active material or with the binder. Desirably, the solvent is reasonably volatile to facilitate its removal at room temperature. Among the solvents which may be employed are low-molecular weight halogenated and partially halogenated hydrocarbons such as methylene chloride, low-molecular weight aromatic compounds such as toluene, low-molecular weight alcohols such as methanol and mixtures of these compounds. The slurry may also include additives adapted to modify the properties of the binder, such as plasticizers and/or crystallization modifiers. Any such additives should be compatible with the other ingredients in the slurry and should be selected so that the additive does not adversely affect the performance of the finished cell. As further explained hereinbelow, ethylene carbonate is particularly preferred as an additive for use with polyethylene oxide binders. Other additives useful for this purpose are propylene carbonate, polyethylene glycol and polypropylene glycol.

The proportion of binder to electrochemically active material in the electrode precursor, before dissolution of the binder in the electrolyte will be substantially the same as the ratio of binder to active material in the slurry. Preferably, the ratio by weight of binder to active material in the slurry, and in the electrode precursor, is between about 0.5:100 and about 10:100, more preferably between about 1:100 and about 6:100 and most preferably between about 2:100 and about 3:100. Within these ranges the binder:active material ratio is selected to provide physical properties in the electrode precursor before assembly. Also, if the active material is pyrophoric or otherwise reactive with air, the binder:active material ratio should be high enough to provide binder sufficient to fully coat the particles of active material. Typically, this requires a binder:active material ratio of at least 2:100.

Where an additive is employed, the required amount will vary with the nature of the additive. However, where ethylene carbonate is employed as an additive with a polyethylene oxide binder, the ratio by weight of ethylene carbonate to PEO in the slurry may be about 1:1 to about 2:1. The amount of solvent in the slurry is selected to facilitate mixing and to provide the viscosity necessary for the particular coating process employed. Where a conventional knife or roll coating process is employed, the slurry desirably has a pastelike consistency. The ratio by weight of solvent to active material ordinarily is 0.5:1 to about 2:1 and typically about 0.7:1 to about 1:1. Excess solvent may be employed to facilitate mixing and the viscosity of the slurry may be adjusted by evaporating a portion of the solvent from the slurry after mixing. Where the active material is reactive with air, the mixing operation should be conducted in an inert atmosphere.

The laminar structure 34 incorporating the electrode precursor layer 38 and support 22 (FIG. 2) as formed during the coating operation should have sufficient mechanical integrity to withstand the assembly process, including the convoluting or spiral-winding step. Where polyethylene oxide (PEO) is employed as the binder, the molecular weight of the polyethylene oxide utilized in the process can affect the mechanical integrity of the laminar structure. Where no additive is employed in the slurry, so-called "high molecular weight" PEO having average molecular weight in excess of about $1 \times 10^6$ and preferably about $2 \times 10^6$ provides god mechanical characteristics. However, the mechanical integrity of layers incorporating high molecular weight PEO can be impaired by segregation of the slurry during the coating and drying processes. Although the present invention is not limited by any theory of operation, it is believed that this segregation results from viscoelasticity induced by the high molecular weight PEO. Segregation of this nature can be inhibited by using a relatively high viscosity, low solvent content slurry so as to inhibit flow and hence retard segregation. However, extremely high viscosity slurries are difficult to spread into a smooth, coherent layer. Some "low-molecular weight" PEO, having average molecular weight of less than about $1 \times 10^6$, preferably less than about $5 \times 10^5$ and most preferably about $3 \times 10^5$ may be employed in admixture with high-molecular weight PEO. Typically, the low-MW and high-MW PEO components are provided in approximately equal amounts, i.e., at a ratio by weight of low:high MW components of about 1:2 to about 2:1, and most preferably about 1:1.

Such mixtures generally provide mechanical properties superior to those achieved with high MW PEO alone.

Low-MW PEO having average MW below $1 \times 10^6$, typically below about $5 \times 10^5$ and most preferably about $3 \times 10^5$ can be employed by itself, without any high-MW PEO, and provides superior spreadability, apparently due to the relatively low slurry viscosities for a given PEO content. However, low-MW PEO alone generally provides inferior mechanical coherence unless crystallization modifier such as ethylene carbonate is employed in the coating slurry. Preferably, the ratio of ethylene carbonate to PEO by weight in the slurry is about 1:1 to abut 2:1. The ethylene carbonate is believed to function principally during the drying step so as to modify the crystallization habit of the low molecular weight PEO. A minor proportion of the ethylene carbonate typically is removed by evaporation along with the more volatile solvent components. The remainder of the ethylene carbonate can be deliberately removed (as by continued evaporation) or can remain in the binder in the electrode precursor layer. In this case, the ethylene carbonate of the binder will mix with the cell electrolytes when the binder dissolves in the electrolyte. In either case, the low-MW PEO will provide satisfactory mechanical properties in the laminar structure.

The laminar structure ordinarily will degrade somewhat during storage at room temperature. Typically, the laminar structure becomes unsatisfactory after a few days storage at about 20° C. Where the laminar structure is consumed within a few days after the coating and drying operations, it can be stored at room temperature. However, it is greatly preferred to store the laminar structure at temperatures below about 0° C. and more preferably below about −10° C. Laminar structures stored at these lower temperatures retain satisfactory mechanical characteristics for several weeks or months. Ordinarily, the laminar structure can be stored satisfactorily in roll form, as on supply reels 36 (FIGS. 1 and 3), with the electrode precursor or particulate material layer 38 of each turn on the roll abutting the rear face of the foil or support 22 on the neighboring turn. With the preferred binder systems according to the present invention, so-called "blister" or failures generally do not occur during storage. That is, the electrode precursor layer in each turn remains attached to its own support or foil layer 22, and does not stick to the rear face of the foil on the neighboring turn. This constitutes a further, significant improvement over typical binder systems such as EPDM, which are susceptible to such blister failures upon storage in roll form.

The mechanical integrity of the laminar structure can be tested by a controlled bending test. One such test method, referred to herein as the "bend" test involves wrapping the laminar structure over a 0.90 inch (22.9 mm) diameter cylindrical pin so that the rear face of the foil or support layer 22 is in contact with the pin surface over a 180° arc and the electrode precursor layer 38 faces away from the pin, and pulling the laminar structure slowly over the pin while maintaining the 180° wrap angle. If the laminar structure can be pulled over the pin in this fashion without visible flaking, cracking or detachment of the electrode precursor layer, it is considered to have satisfactory mechanical integrity to withstand typical spiral-winding or convoluting processes.

The following examples illustrate, but do not limit, certain aspects of the present invention:

EXAMPLE 1

Mixed High and Low Molecular Weight Binder

A slurry is prepared by mixing 98 g of dried $MoS_2$ cathode powder, 1 g of polyethylene oxide (molecular weight 2,000,000), 1 g of polyethylene oxide (molecular weight 300,000) and 90 ml of methylene chloride. A fraction of the methylene chloride is evaporated until a paste-like consistency is obtained. The paste-like slurry is spread in a layer about 0.2 mm thick on a metal foil support about 0.018 mm thick and dried. The resulting laminar structure has an electrode precursor layer including approximately 2% polyethylene oxide binder and approximately 98% $MoS_2$ powder. The laminar structure passes the bend test and is free of blister failures upon storage in roll form.

EXAMPLE 2

Low Molecular Weight Binder

A slurry is prepared by mixing 93.5 g of dried $MoS_2$ cathode powder, 2.5 g of polyethylene oxide (molecular weight 300,000), 3 ml of ethylene carbonate, 18 ml of toluene, and 72 ml of methanol. This slurry is spread in a layer on a foil support as in Example 1. The resulting laminar structure includes an electrode precursor layer incorporating approximately 2.6% polyethylene oxide binder by weight. The laminar structure passes the bend test and is free of blister failures.

EXAMPLE 3

Effect of Temperature During Storage

A laminar structure is prepared by the same procedure as in Example 1 but using about 3 ml ethylene carbonate in addition to the methylene chloride in the solvent. Immediately after drying, the laminar structure passes the bend test. However, pieces of the structure fail the test after storage for three days at room temperature. Other pieces of the same structure stored at −7° C. or −20° C. for 50 days pass the bend test.

EXAMPLE 4

$Li_4Mo_6S_8$ Cathodes

A mixture of 9.4 g of $Li_4Mo_6S_8$, 0.4 g of ethylene carbonate and 0.2 g of polyethylene oxide (molecular weight 2,000,000) is prepared in a helium filled glove box. Methylene chloride is added to the mixture to form a slurry. One portion of the slurry is transferred from the glove box to a dry room under an atmosphere of air at 0.5% relative humidity, spread on an aluminum foil support in a 0.2 mm layer and dried. After drying, the resulting laminar structure is compressed between rollers at about 1000 psi. The laminar structure, after compression is mechanically stable. This structure is assembled with other cell components in the dry air atmosphere. Another portion of the slurry is subjected to the same spreading, drying and assembly procedures under the helium atmosphere in the glove box to form another cell. Both cells behave identically, demonstrating that the polyethylene oxide coating protects the $Li_4Mo_6S_8$ powder from the oxidizing environment during handling in the dry room.

EXAMPLE 5

$Li_2FeS_2$ Cathodes

The procedures of Example 4 are repeated, but using $Li_2FeS_2$ instead of $Li_4Mo_6S_8$. Again, cells prepared with spreading, drying and assembly in dry air perform identically to cells prepared entirely in a helium atmosphere. The smell of hydrogen sulfide, normally detectable when $Li_2FeS_2$ is exposed to air, cannot be detected when the laminar structure made above is exposed to air. This confirms that the binder protects the $LiFeS_2$.

EXAMPLE 6

Performance Comparison

The laminar structure of Example 1, containing approximately 2% polyethylene binder in the electrode precursor layer is assembled with a separator and with a lithium anode foil in a laboratory cell housings commonly referred to as a "button cell". The cell housings are filled with an electrolyte consisting of 50% propylene carbonate and 50% ethylene carbonate by volume. The same procedure is used with a control laminar structure incorporating approximately 0.5% EPDM or polymer of ethylene propylene diene monomer as a binder, in conjunction with the same $MoS_2$ used in the test laminar structure. EPDM is substantially inert and insoluble in the electrolyte.

Figure 7:
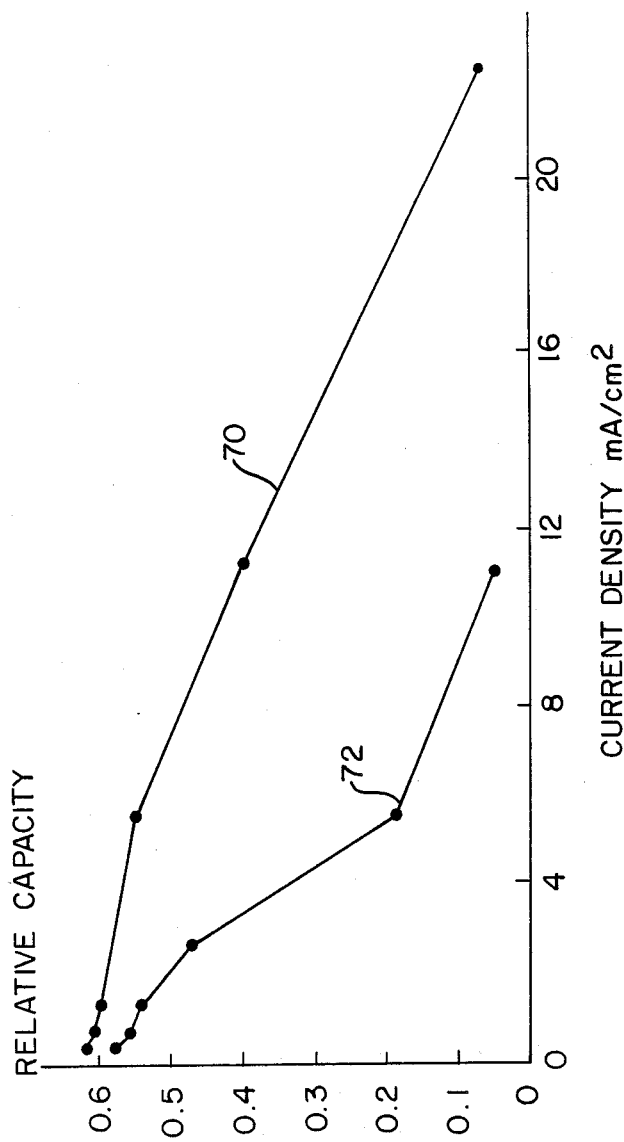
FIG. 7 is a graph of rate capability versus current density.

In a "rate capability" test, the cells are discharged at various rates in each case until the voltage across the cell reaches a cut off voltage of 1.1 volts, corresponding to a state of substantial discharge. The discharge rate is expressed as the current density or current per unit area of the cathode layer, expressed in miliamperes per square centimeter. In each such discharge cycle, the "discharge capacity" or amount of charge transferred is monitored and expressed in terms of "delta x" or the change in the value of the subscript x in the stoichiometric formula $Li_xMoS_2$. Stated another way, the discharge capacity is measured in terms of charge transferred per unit $MoS_2$. The results are as indicated in FIG. 7. Curve 70 depicts the performance of the test cell with the soluble PEO binder, whereas curve 72 depicts the control cell with the EPDM binder. These curves demonstrate that the cell made in accordance with the principles of the present invention, utilizing a soluble binder, has a higher capacity than the cell with the insoluble binder. The difference between the two becomes progressively greater at progressively increasing current density. These results are consistent with freer passage of ions between the electrolyte and the particulate electrochemically active material in the test cell and are also consistent with lower electrical resistance within the particulate material of the cathode in the test cell. Stated another way, the results indicate that the test cell does not suffer from the detrimental effects typically associated with EPDM binder. These results are particularly significant inasmuch as the cathode precursor layer used to make the test cell initially incorporated a far higher proportion of binder than did the comparable layer used to make the control cell.

Further test and control cells substantially identical with those described above are subjected to repeated charge and discharge cycles at charge and discharge current rates of about 0.5 miliamperes per square centimeter, well within the normal operating range of the control or EPDM-based cell. A voltage of 1.1 volts is again used as the end point on each discharge cycle. On each discharge cycle, the total charge transferred is measured and normalized so that the charge transferred on the first discharge cycle is given an arbitrary value of 100%, whereas the charge transferred on subsequent cycles from the same cell is stated as a percentage of the charge transferred from the same cell on the first cycle.

Figure 8:
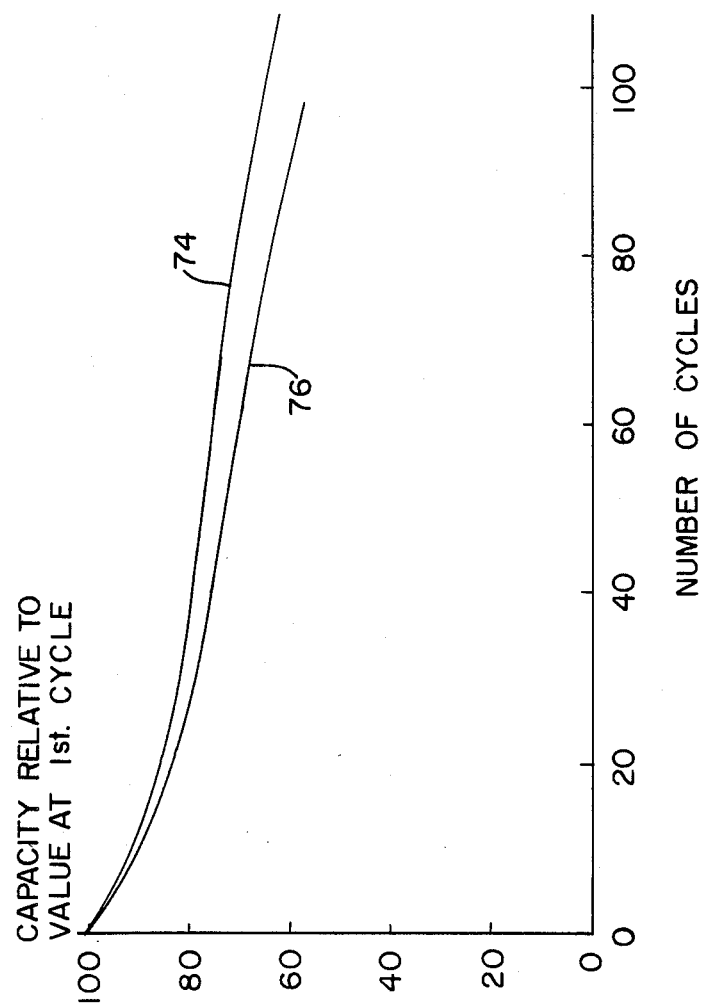
FIG. 8 is a graph of discharge capacity versus cycle number.

The results are depicted in FIG. 8, wherein curve 74 shows the performance of the test cell and curve 76 indicates the performance of the control cell. There is no significant difference between the results achieved for test and control cells in this regard. Thus, the soluble binder in the test cell does not cause any appreciable degradation of the other cell components during use.

Numerous variations and combinations of the features discussed above can be employed in the present invention. Thus, the particulate electrochemically active material need not be a cathode active material, but instead may be an anode-active material. Also, the electrode precursor can be formed by depositing a layer of the binder and particulate, active material on a support other than a foil capable of acting as a current collector. Indeed, an electrode precursor in layer form can be made without sheetlike support, as by casting a slurry onto a roll, drying the slurry on the roll and then stripping off the resulting electrode precursor layer. Also, it is within the broadest concept of the invention to form the electrode precursor in the form of a sheetlike layer or in other forms either by extruding a slurry as aforementioned through a die or by extruding a combination of the electrochemically active particulate material and the soluble binder in molten form. As aforementioned, the invention provides particular benefits in the case where a convoluted particulate electrode is required. Although the spiral-wound form represents the most preferred form of convoluted electrode, other convoluted forms such as folded forms may be employed.

In the embodiments discussed above, the soluble binder dissolves in the electrolyte so that the electrolyte serves to remove the binder from the electrode precursor and hence to form the electrode devoid of soluble binder. However, it is possible within the broadest concept of the invention to employ another liquid of either the same or different composition from the electrolyte to dissolve binder from the electrode precursor layer. Thus, after the electrode precursor layer has been assembled to the other components of the cell so that the electrode precursor is engaged with the other components, a wash liquid other than the electrolyte can be temporarily introduced into the cell and then removed, taking the binder with it. The cell casing thus would have appropriate inlets and outlets to accommodate such washing. If the wash liquid has a composition different from that of the electrolyte ultimately used in the cell, the constituents of the wash fluid should be selected so that residual wash liquid remaining in the cell will not adversely affect cell performance. As this arrangement adds another step to the manufacturing process, it is generally less preferred. However, it can be used to advantage where a particularly high binder content is employed in the electrode precursor or where the increase in electrolyte viscosity typically caused by dissolved binder cannot be tolerated.

As these and other objects, features and advantages of the foregoing invention can be utilized without departing from the invention as defined in the claims, the foregoing description of the preferred embodiments should be taken by way of illustration rather than by way of limitation of the invention.

We claim:
1. An electrochemical cell including:
   a first electrode having a convoluted substantially internally non-coherent layer of a particulate, electrochemically active material, substantially devoid of interstitial binder connecting the particles of said active material to one another, overlying a convoluted sheet-like metallic foil support;

a counterelectrode space from said layer;

an electrolyte in contact with said layer and said counterelectrode; and means for maintaining a compressive load on said substantially internally non-coherent layer of particulate materials;

wherein said compressive load maintains said particulate material in a coherent layer.

2. A cell according to claim 1 wherein said layer is juxtaposed with a sheetlike porous separator so that said layer is disposed between said support and said separator.

3. A cell according to claim 2 wherein said counterelectrode includes a sheetlike counter structure, and the separator is disposed between the counter structure and the layer so that said counter structure, separator, layer and support form a sandwich structure.

4. A cell according to claim 3 further comprising means for maintaining said sandwich structure under compression.

* * * * *